(12) United States Patent  
Sawyer

(10) Patent No.: US 8,387,758 B1
(45) Date of Patent: Mar. 5, 2013

(54) BRAKE ADJUSTMENT INDICATOR

(75) Inventor: Peter A. Sawyer, Oakland, RI (US)

(73) Assignee: Laura Jean Hunt, Danielson, CT (US)

(*) Notice: Subject to any disclaimer, the term of this patent is extended or adjusted under 35 U.S.C. 154(b) by 641 days.

(21) Appl. No.: 12/625,615

(22) Filed: Nov. 25, 2009

Related U.S. Application Data

(63) Continuation-in-part of application No. 11/388,598, filed on Mar. 27, 2006, now abandoned.

(51) Int. Cl.
 F16D 66/00 (2006.01)
 F16D 66/02 (2006.01)
(52) U.S. Cl. .......... 188/1.11 L; 188/1.11 W; 188/1.11 R
(58) Field of Classification Search .............. 188/1.11 L, 188/1.11 W, 1.11 R; 116/208; 340/454
 See application file for complete search history.

(56) References Cited

U.S. PATENT DOCUMENTS

| | | | |
|---|---|---|---|
| 3,788,131 A | 1/1974 | Markey | |
| 4,279,214 A | 7/1981 | Thorn | |
| 4,989,537 A | 2/1991 | Hutchinson, Sr. et al. | |
| 5,178,092 A | 1/1993 | Schedin | |
| 5,269,253 A | 12/1993 | Spurlock | |
| 5,320,198 A | 6/1994 | Hoyt et al. | |
| 5,825,287 A | 10/1998 | Zarybnicky, Sr. et al. | |
| 6,019,197 A | 2/2000 | Judson | |
| 6,213,254 B1 | 4/2001 | Lanou, Jr. | |
| D480,953 S | 10/2003 | Lee et al. | |

Primary Examiner — Bradley King
Assistant Examiner — Mahbubur Rashid
(74) Attorney, Agent, or Firm — Salter & Michaelson

(57) ABSTRACT

A brake adjustment indicator for indicating when an air brake is out of adjustment during a visual inspection of the air brake includes a collar including a perimeter wall defining a bore. The bore of the collar receives a push rod of an air brake to position the collar around the push rod. The collar is inserted into an air piston housing when the air brake is released. At least a portion of the collar extends from the air piston housing to indicate an amount of adjustment needed for the air brake when the air brake is engaged. A flange is coupled to and extends radially outwardly from the collar to abut the air piston housing and inhibit debris entering the air piston housing adjacent to the collar. The flange has an aperture aligned with the bore of the collar to receive the push rod.

20 Claims, 4 Drawing Sheets

US 8,387,758 B1

BRAKE ADJUSTMENT INDICATOR

RELATED APPLICATION

The present application is a continuation-in-part of application Ser. No. 11/388,598 filed on Mar. 27, 2006

FIELD OF THE INVENTION

The present invention relates to air brake wear indicators and more particularly pertains to a new air brake wear and adjustment indicator for indicating when an air brake is out of adjustment during a visual inspection of the air brake.

BACKGROUND OF THE INVENTION

The use of air brake wear indicators is known in the prior art. The prior art commonly teaches the use of indicators that require at least a partial disassembling of an air brake system to allow the air brake wear indicators to be coupled to the system.

While these devices fulfill their respective, particular objectives and requirements, the need remains for a device that has certain improved features that allow for the device to split and be easily mounted to a pushrod of the air brake system. Additionally, the device uses individual colors to indicate the adjustment level of the air brake system.

SUMMARY OF THE INVENTION

The present invention meets the needs presented above by generally comprising a collar including a perimeter wall defining a bore extending along a length of the collar. The bore of the collar receives a push rod of an air brake to position the collar around the push rod. The collar is inserted into an air piston housing when the air brake is released and the push rod is retracted towards the air piston housing. At least a portion of the collar extends from the air piston housing to indicate an amount of adjustment needed for the air brake when the air brake is engaged. A flange is coupled to and radially extends outwardly from the collar. The flange abuts the air piston housing to inhibit debris entering the air piston housing adjacent to the collar when the collar is positioned in the air piston housing. The flange has an aperture aligned with the bore of the collar to receive the push rod when the push rod is positioned in the bore of the collar.

In accordance with other aspects of the present invention there is provided the perimeter wall of the collar has a second slit extending into an exterior face of the collar and through the perimeter wall to the bore, said second slit extending longitudinally only a predetermined length that is less than the full length of the collar; preferably the second slit is disposed substantially diametrically of the first slit; the flange has a first split extending into a peripheral edge of the flange to the aperture, said flange being comprised of a resiliently flexible material to permit separation of said flange along at least the first split to facilitate insertion of the push rod into the aperture; the flange preferably has a second split extending into a peripheral edge of the flange to the aperture, said first and second splits dividing the flange into separate flange portions; the second split is disposed substantially diametrically of the first split; the flange preferably has a pair of opposed holes for receiving a retaining means for holding together the separate flange portions; and the retaining means preferably comprises a dog bone shaped retainer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

Figure 1:
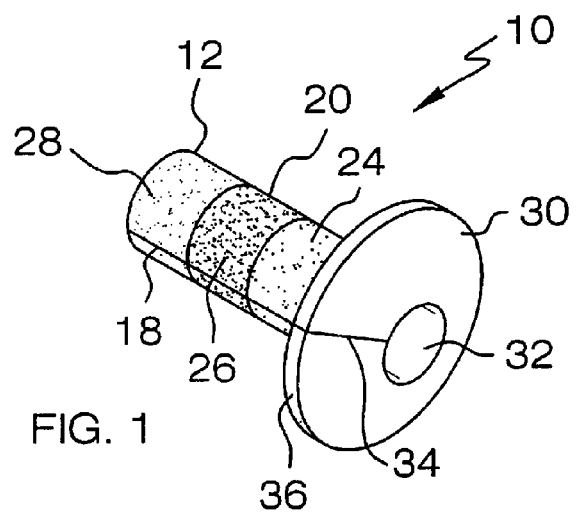
FIG. 1 is a front perspective view of a brake adjustment indicator according to the present invention.
Figure 2:
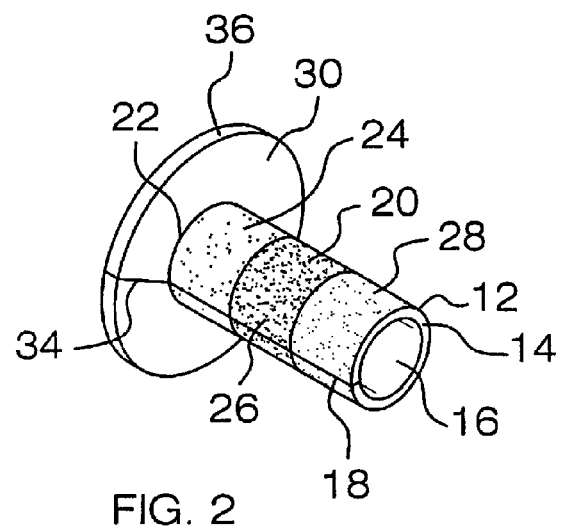
FIG. 2 is a rear perspective view of the present invention.

With reference now to the drawings, and in particular to FIGS. 1 through 6 thereof, a new air brake wear indicator embodying the principles and concepts of the present invention and generally designated by the reference numeral 10 will be described. In FIGS. 7-10 a preferred second embodiment of the air brake wear indicator is shown.

As illustrated in FIGS. 1 through 6, the brake adjustment indicator 10 generally comprises a collar 12 including a perimeter wall 14 defining a bore 16 extending along a length of the collar 12. The bore 16 of the collar 12 receives a push rod 1 of an air brake 2 to position the collar 12 around the push rod 1. The collar 12 is inserted into an air piston housing 3 when the air brake 2 is released and the push rod 1 is retracted towards the air piston housing 3. At least a portion of the collar 12 extends from the air piston housing 3 to indicate an amount of adjustment needed for the air brake 2 when the air brake 2 is engaged. The perimeter wall 14 has a slit 18 extending into an exterior face 20 of the collar 12 and through the perimeter wall 14 to the bore 16. The collar 12 is comprised of a resiliently flexible material to permit the perimeter wall 14 to be separated along the slit 18 and slid over the push rod 1 to position the push rod 1 in the bore 16.

Figure 4:
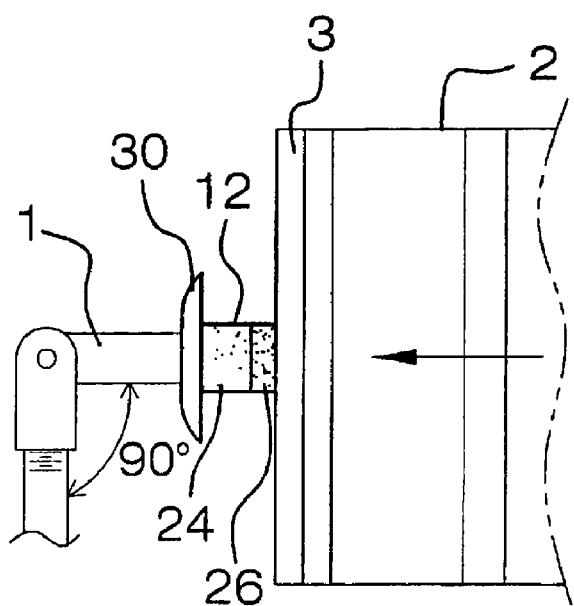
FIG. 4 is a side view of the present invention when the air brake is approaching required adjustment.
Figure 5:
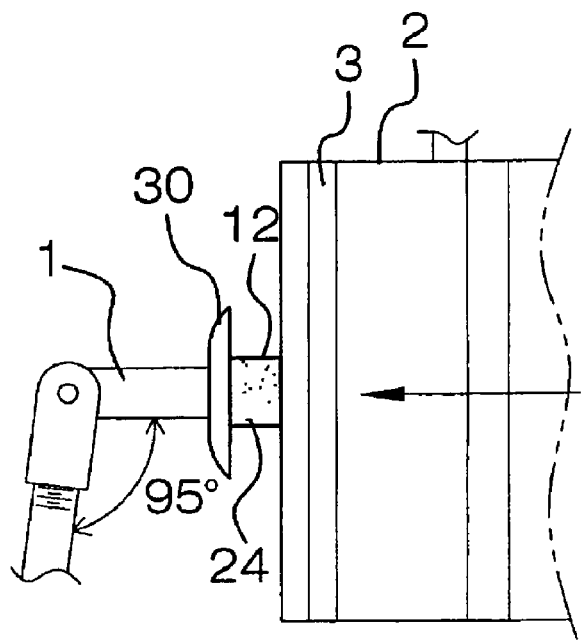
FIG. 5 is a side view of the present invention when the air brake is within optimal adjustment limits.

The collar 12 includes a first end 22 positioned a distance from the air piston housing 3 when the air brake 2 is engaged. A first portion 24 is positioned adjacent the first end 22. The first portion 24 indicates the air brake 2 is within acceptable adjustment limits when only the first portion 24 is extended from the air piston housing 3 during engagement of the air brake 2, as shown in FIG. 5. The first portion 24 has a first color to facilitate visibility of the first portion 24 when the air brake 2 is inspected. A second portion 26 is coupled to the first portion 24 opposite the first end 22. The second portion 26 indicates the air brake 2 is approaching unacceptable adjustment limits when the first portion 24 and the second portion 26 are extended from the air piston housing 3 during engagement of the air brake 2, as shown in FIG. 4. The second portion 26 has a second color to facilitate visibility of the second portion 26 when the air brake 2 is inspected.

Figure 3:
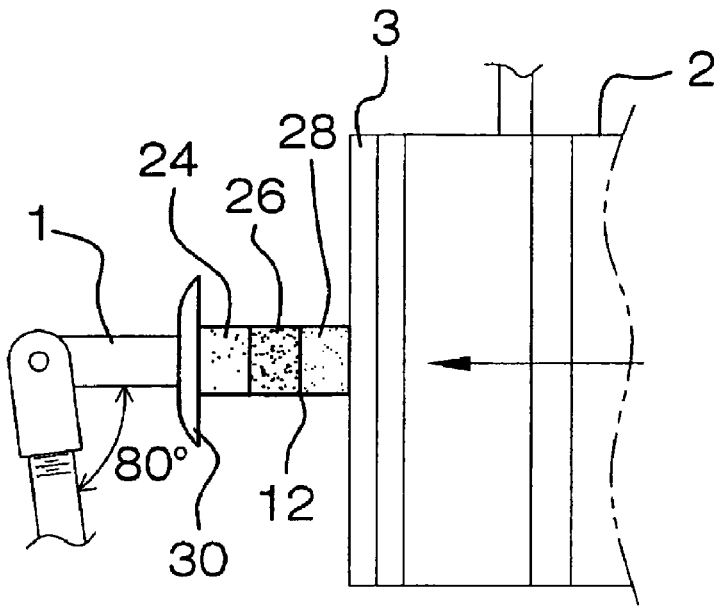
FIG. 3 is a side view of the present invention when the air brake is in need of adjustment.

The collar 12 also includes a third portion 28 coupled to the second portion 26 opposite the first portion 24. The third portion 28 indicates the air brake 2 is outside of acceptable adjustment limits when the first portion 24, the second portion 26 and the third portion 28 are extended from the air piston housing 3 during engagement of the air brake 2, as shown in FIG. 3. The third portion 28 has a third color to facilitate visibility of the third portion 28 when the air brake 2 is inspected.

Figure 6:
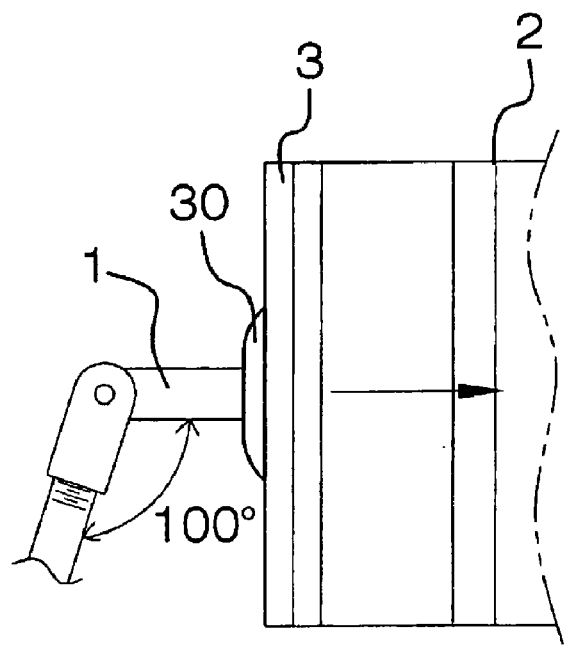
FIG. 6 is a side view of the present invention when the air brake is disengaged.

A flange 30 is coupled to and radially extends outwardly from the collar 12. The flange 30 abuts the air piston housing 3 to inhibit debris entering the air piston housing 3 adjacent to the collar 12 when the collar 12 is positioned in the air piston housing 3, as shown in FIG. 6. The flange 30 is coextensive with the first end 22 of the collar 12. The flange 30 has an aperture 32 aligned with the bore 16 of the collar 12 to receive the push rod 1 when the push rod 1 is positioned in the bore 16 of the collar 12. The flange 30 has a split 34 extending into a peripheral edge 36 of the flange 30 to the aperture 32 and is aligned with the slit 18 of the collar 12. The split 34 and slit 18 are contiguous so that both the collar and flange are separable. The flange 30 is comprised of a resiliently flexible material to permit separation of the flange 30 along the split 34 (as well as separation of the collar 12 along slit 18) to facilitate insertion of the push rod 1 into the aperture 32.

In use, the flange 30 is separated along the split 34 and the perimeter wall 14 of the collar 12 is separated along the slit 18 to allow the push rod 1 of the air brake 2 to being inserted into the aperture 32 and the bore 16 when the air brake 2 is properly adjusted. The flange 30 is then abutted against the air piston housing 3 when the air brake 2 is released. The air brake 2 is then engaged and the air brake 2 is inspected to see how much of the collar 12 extends from the air piston housing 3 to see the level of adjustment of the air brake 2 to maintain proper braking when the air brake 2 is engaged.

Figure 7:
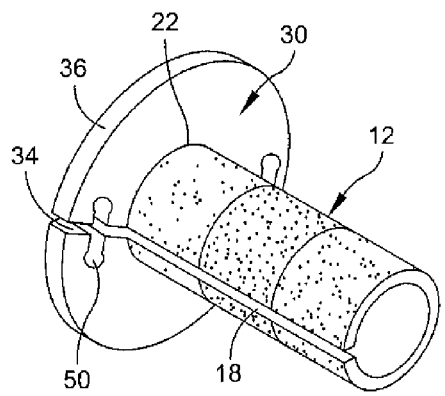
FIG. 7 is a front perspective view of a second embodiment of the brake adjustment indicator in accordance with the present invention.
Figure 8:
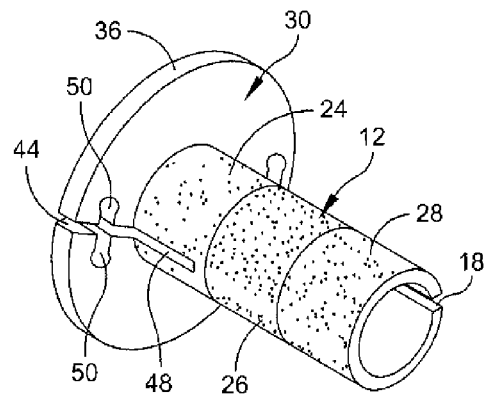
FIG. 8 is an alternate front perspective view of the embodiment shown in FIG. 7.
Figure 9:
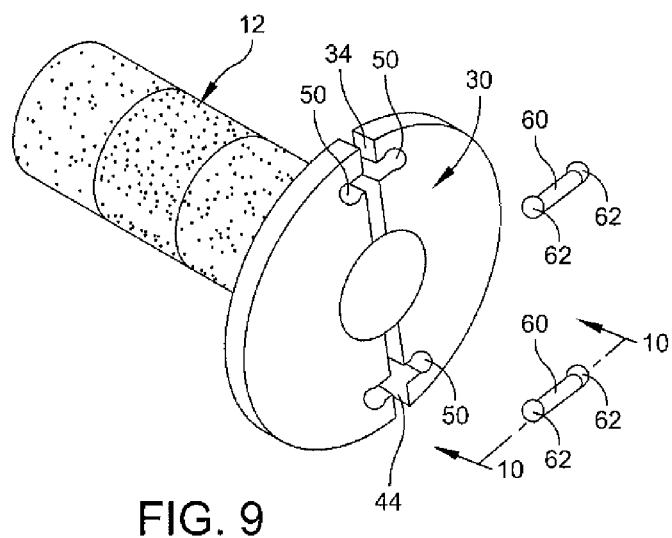
FIG. 9 is a rear perspective view of the embodiment shown in FIG. 7 and also illustrating retaining pieces.
Figure 10:
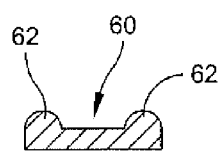
FIG. 10 is a cross-sectional view of the "dog bone" retainer.

Reference is now made to the second embodiment of the present invention. As a substantial part of this embodiment is constructed the same as the embodiment shown in FIGS. 1-6, the same references numbers are used to identify lake parts and characteristics. Thus, FIG. 7 is a front perspective view of this second embodiment of the brake adjustment indicator in accordance with the present invention. FIG. 8 is an alternate front perspective view of the embodiment shown in FIG. 7. FIG. 9 is a rear perspective view of the embodiment shown in FIG. 7 and also illustrating retaining pieces. FIG. 10 is a cross-sectional view of the "dog bone" retainer.

As illustrated in FIGS. 7 through 10, the brake adjustment indicator 10 generally comprises a collar 12 including a perimeter wall 14 defining a bore 16 extending along a length of the collar 12. The bore 16 of the collar 12 receives a push rod 1 of an air brake 2 to position the collar 12 around the push rod 1. The collar 12 is inserted into an air piston housing 3 when the air brake 2 is released and the push rod 1 is retracted towards the air piston housing 3. At least a portion of the collar 12 extends from the air piston housing 3 to indicate an amount of adjustment needed for the air brake 2 when the air brake 2 is engaged. The perimeter wall 14 has a slit 18 extending into an exterior face 20 of the collar 12 and through the perimeter wall 14 to the bore 16. The collar 12 is comprised of a resiliently flexible material to permit the perimeter wall 14 to be separated along the slit 18 and slid over the push rod 1 to position the push rod 1 in the bore 16.

Reference is now made to FIGS. 7 through 9 where the slit 18 is shown extending the complete length of the collar 12 (FIG. 7) to assist in placing the indicator device over the brake system push rod. In addition, as shown in the perspective view in FIG. 8, at a position 180 degrees opposite to the slit 18, there is provided a second slit 48 that extends from the end 22 of the collar 12 a predetermined distance that is about one inch long and preferably in a range of ⅜ to ½ inch.

The flange 30 is coupled to and radially extends outwardly from the collar 12. The flange 30 abuts the air piston housing 3 to inhibit debris entering the air piston housing 3 adjacent to the collar 12 when the collar 12 is positioned in the air piston housing 3, as shown in FIG. 6. The flange 30 is coextensive with the first end 22 of the collar 12. The flange 30 has an aperture 32 aligned with the bore 16 of the collar 12 to receive the push rod 1 when the push rod 1 is positioned in the bore 16 of the collar 12. The flange 30 has a split 34 extending into a peripheral edge 36 of the flange 30 to the aperture 32 and is aligned with the slit 18 of the collar 12. The split 34 and slit 18 are contiguous so that both the collar and flange are separable. The flange 30 is comprised of a resiliently flexible material to permit separation of the flange 30 along the split 34 (as well as separation of the collar 12 along slit 18) to facilitate insertion of the push rod 1 into the aperture 32.

In this second embodiment, in addition to the split 34 in the flange 30, there is provided an opposite position split 44 extending into a peripheral edge 36 of the flange 30 to the aperture 32 and is aligned with the slit 48 of the collar 12. The split 44 and slit 48 are contiguous so that both the collar and flange are at least partially separable at that location. The addition of the split 44 and slit 48 further assists in enabling the separation of the air brake indicator so that it can be positioned over the brake system push rod. The splits 34, 44 essentially separate the flange 30 into separate semi-circular flange portions.

In use this second embodiment operates basically the same as previously discussed. When the air brake indicator is positioned over the push rod it is desirable, but optional, to provide a small amount of an adhesive or glue between the collar of the air brake indicator and the push rod so as to make sure the air brake indicator stays in place. Moreover, the flange 30 is provided with a retaining means to hold the air brake indicator about the push rod. This retaining means is disclosed in the form of a pair of dog bone shaped retainers (see FIGS. 9 and 10) accommodated in a pair of holes. These holes are shown in FIGS. 7 through 9 at 50. There is one pair of holes 50 associated with split 34 and another pair of holes 50 associated with split 44. These holes are each open to the respective splits 34, 44. The dog bone retainers 60 each have a set of tabs 62 that are meant to engage with a respective pair of holes 50. This engagement closes the splits 34, 44 and thus assists in holding the air brake indicator about the push rod. These dog bone retainers 60 can also be easily removed if necessary. The dog bone retainers are engaged with the flange holes once the collar is fit over the push rod.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A brake adjustment indicator for indicating adjustment of an air brake on a vehicle, said indicator comprising:
   a collar including a perimeter wall defining a bore extending along a length of said collar, said bore of said collar receiving a push rod of the air brake to position said collar around the push rod, at least a portion of said collar extending from the air piston housing to indicate an amount of adjustment needed for the air brake when the air brake is engaged; and
   a flange being coupled to and radially extends outwardly from said collar, said flange having an aperture aligned with said bore of said collar to receive the push rod when the push rod is positioned in said bore of said collar;
   wherein said collar includes a first end, said flange being coextensive with said first end of said collar, said perimeter wall having a first slit extending into an exterior face of said collar and through said perimeter wall to said bore, said first slit extending longitudinally the full length of the collar;
   and wherein the perimeter wall of said collar has a second slit extending into an exterior face of said collar and through said perimeter wall to said bore, said second slit extending longitudinally only a predetermined length that is less than the full length of the collar.

2. The indicator according to claim 1, said collar being comprised of a resiliently flexible material to permit said perimeter wall to be separated along at least said first slit and slid over the push rod to position the push rod in said bore.

3. The indicator according to claim 1, wherein said first end is positioned a distance from a air piston housing when the air brake is engaged, said flange being coextensive with said first end of said collar.

4. The indicator according to claim 3, wherein said collar includes a first portion being positioned adjacent said first end, said first portion indicating the air brake being within acceptable adjustment limits when only said first portion is extended from the air piston housing during engagement of the air brake.

5. The indicator according to claim 4, wherein said first portion has a first color to facilitate visibility of said first portion when the air brake is inspected.

6. The indicator according to claim 3, wherein said collar includes a second portion coupled to said first portion opposite said first end, said second portion indicating the air brake is approaching unacceptable adjustment limits when said first portion and said second portion are extended from the air piston housing during engagement of the air brake.

7. The indicator according to claim 6, wherein said second portion has a second color to facilitate visibility of said second portion when the air brake is inspected.

8. The indicator according to claim 6, wherein said collar includes a third portion being coupled to said second portion opposite said first portion, said third portion indicating the air brake being outside of acceptable adjustment limits when said first portion, said second portion and said third portion are extended from the air piston housing during engagement of the air brake.

9. The indicator according to claim 8, wherein said third portion has a third color to facilitate visibility of said third portion when the air brake is inspected.

10. The indicator according to claim 1, wherein said flange has a split extending into a peripheral edge of said flange to said aperture, said flange being comprised of a resiliently flexible material to permit separation of said flange along said split to facilitate insertion of the push rod into said aperture.

11. The indicator according to claim 1, wherein said collar includes a first end positioned a distance from the air piston housing when the air brake is engaged, said flange being coextensive with said first end of said collar, said perimeter wall having a first slit extending into an exterior face of said collar and through said perimeter wall to said bore, said first slit extending longitudinally the full length of the collar.

12. The indicator according to claim 11 wherein said collar is comprised of a resiliently flexible material to permit said perimeter wall to be separated along at least said first slit and slid over the push rod to position the push rod in said bore.

13. A brake adjustment indicator for indicating adjustment of an air brake on a vehicle, said indicator comprising:
   a collar including a perimeter wall defining a bore extending along a length of said collar, said bore of said collar receiving a push rod of the air brake to position said collar around the push rod, said collar being inserted into an air piston housing when the air brake is released and the push rod is retracted towards the air piston housing, at least a portion of said collar extending from the air piston housing to indicate an amount of adjustment needed for the air brake when the air brake is engaged; and
   a flange being coupled to and radially extends outwardly from said collar, said flange abutting the air piston housing to inhibit debris entering the air piston housing adjacent to said collar when said collar is positioned in the air piston housing, said flange having an aperture aligned with said bore of said collar to receive the push rod when the push rod is positioned in said bore of said collar;
   wherein said collar includes a first end positioned a distance from the air piston housing when the air brake is engaged, said flange being coextensive with said first end of said collar, said perimeter wall having a first slit extending into an exterior face of said collar and through said perimeter wall to said bore, said first slit extending longitudinally the full length of the collar; and
   wherein the perimeter wall of said collar has a second slit extending into an exterior face of said collar and through said perimeter wall to said bore, said second slit extending longitudinally only a predetermined length that is less than the full length of the collar.

14. The indicator according to claim 13 wherein the second slit is disposed substantially diametrically of the first slit.

15. The indicator according to claim 13 wherein said flange has a first split extending into a peripheral edge of said flange to said aperture, said flange being comprised of a resiliently flexible material to permit separation of said flange along at least said first split to facilitate insertion of the push rod into said aperture.

16. The indicator according to claim 15 wherein said flange has a second split extending into a peripheral edge of said flange to said aperture, said first and second splits dividing the flange into separate flange portions.

17. The indicator according to claim 16 wherein the second split is disposed substantially diametrically of the first split.

18. The indicator according to claim 16 wherein said flange has a pair of opposed holes for receiving a retaining means for holding together the separate flange portions.

19. The indicator according to claim 18 wherein the retaining means comprises a dog bone shaped retainer.

20. The indicator according to claim 16, wherein said collar includes a first portion being positioned adjacent said first end, said first portion indicating the air brake being within acceptable adjustment limits when only said first portion is extended from the air piston housing during engagement of the air brake; wherein said first portion has a first color to facilitate visibility of said first portion when the air brake is inspected; wherein said collar includes a second portion coupled to said first portion opposite said first end, said second portion indicating the air brake is approaching unacceptable adjustment limits when said first portion and said second portion are extended from the air piston housing during engagement of the air brake; wherein said second portion has a second color to facilitate visibility of said second portion when the air brake is inspected; wherein said collar includes a third portion being coupled to said second portion opposite said first portion, said third portion indicating the air brake being outside of acceptable adjustment limits when said first portion, said second portion and said third portion are extended from the air piston housing during engagement of the air brake; and wherein said third portion has a third color to facilitate visibility of said third portion when the air brake is inspected.

\* \* \* \* \*